DEPOSITED LATEX ARTICLES

Original Filed Aug. 5, 1957 3 Sheets-Sheet 1

INVENTORS
WILBUR A. MILLER AND
EDWIN B. GIENGER, JR.
BY
ATTORNEY

DEPOSITED LATEX ARTICLES

Original Filed Aug. 5, 1957 3 Sheets-Sheet 2

INVENTORS
WILBUR A. MILLER AND
EDWIN B. GIENGER, JR.

BY

ATTORNEY

DEPOSITED LATEX ARTICLES

Original Filed Aug. 5, 1957 3 Sheets-Sheet 3

INVENTORS
WILBUR A. MILLER AND
EDWIN B. GIENGER, JR.

BY

ATTORNEY

United States Patent Office

Re. 26,021
Reissued May 10, 1966

26,021
DEPOSITED LATEX ARTICLES

Wilbur A. Miller and Edwin B. Gienger, Jr., Dover, Del., assignors to International Latex Corporation, Dover, Del., a corporation of Delaware Original No. 3,017,889, dated Jan. 23, 1962, Ser. No. 676,325, Aug. 5, 1957. Application for reissue Jan. 23, 1964, Ser. No. 350,933
(Filed under Rule 47(a) and 35 U.S.C. 116)
3 Claims. (Cl. 128—521)

Matter enclosed in heavy brackets [ ] appears in the original patent but forms no part of this reissue specification; matter printed in italics indicates the additions made by reissue.

This invention relates to improvements in the art of making seamless rubber articles, such articles being typically adapted for use as sheaths or envelopes for restraining, protecting or shaping a portion of the human body. A major use of such sheaths has been as rubber girdles, panties, and similar undergarments which are economically made from aqueous dispersions of natural rubber or other elastomers, such dispersions being commonly referred to as rubber latex. Because of the public's familiarity with rubber latex girdles, the present invention will be described as applied thereto. However, those skilled in the art will understand how the invention can be employed in the manufacture of other rubber articles. This application is a continuation-in-part of our copending patent applications, Serial Nos. 350,341, now Patent No. 2,801,445 and 350,342, filed April 22, 1953, now Patent No. 2,867,847.

Rubber latex girdles, as originally disclosed in U.S. Patent 2,360,736, issued October 17, 1944, to A. N. Spanel, have been satisfactory products, as proven by customer acceptance, and have been made additionally attractive to the consuming public by many worth-while improvements. However, attempts to increase the porosity of such girdles have not been heretofore successful even though those skilled in the art have known how to prepare perforate rubber sheeting of various types. Apparently no feasible method has been found to incorporate such sheeting in an enveloping sheath without producing either a weak article or one which has seams that are uncomfortable. The measure of the success in solving this problem can be judged by the fact that no dipped latex girdles which have completely solved the above problem of ventilation in hot weather have ever been marketed in spite of the very obvious sales appeal of such an article.

The present invention overcomes the obstacles apparently found insurmountable by previous workers in the field and, in general, provides seamless, peripherally complete sheath, especially one which is worn in a stretched condition such as a girdle or similar undergarment, of deposited latex film in which a sufficient portion of the body of the girdle is pervious or porous or of a foraminous nature so as to provide for adequate escape of perspiration, even in hot weather. Such porosity is effected by the generation of a multitude of closely spaced, straight pores communicating with both surfaces of the deposited latex film and formed during the manufacture of the articles, as described more fully hereinafter. Such pores advantageously have sides and shoulders shaped by the surface tension exerted on small openings made in a continuous appropriately contoured film of latex while in a plastic, flowable or moldable condition, and consequently have more resistance to tear than punched or sheared perforations.

The invention, therefore, provides an elastic figure-controlling garment, comprising a breathable seamless rubber sheath adapted when on the body to encircle and constrict the torso between the waist and upper thigh regions, the sheath being formed with a side outline approximating the female body contour from an upper relatively narrow waist opening down to a lower relatively wide leg opening. This breathable seamless rubber sheath is formed with laterally, i.e., peripherally, continuous surfaces and has a wall thickness built up by deposit of a plurality of layers of latex, each of said layers having formed therein a network of small closely spaced holes, the holes being characterized by having smooth surfaces shaped by the surface tension of the deposited latex. The holes formed in each of the layers are in registry and extend throughout the thickness of the wall of the sheath. They are disposed over a major portion of the total surface of the sheath, and have a size and spacing so that the sheath has a fine open mesh-like construction providing a breathability not possible with punched or pin perforated holes. The sheath characteristically has one smooth surface with smooth rounded shoulders on the holes, and the opposite surface, that is, the one in contact with the deposition backing *may have* [generally has] relatively thin latex projections surrounding the holes.

In general, such sheaths are generated by dipping in a bath of rubber latex a rigid dipping form of appropriate contour comprising a rigid backing, a peripherally complete article generating surface in which there are pores bridgeable by rubber latex and means to force gas through said pores; removing the dipping form from said bath under conditions, including rate of removal, such that the form is covered by a continuous film of liquid latex (i.e., with substantially all of said pores bridged by films of latex); and creating a multitude of pores in the film of latex by forcing gas out of substantially all of the pores of the dipping form and thereby breaking or bursting the minute portions of the latex film bridged over each pore of the dipping form. The deposited latex film, which now contains a multitude of channels or pores communicating with both surfaces of the film, is thereafter processed, as by a procedure which includes repeating the above operation for building up film thickness, stripping the film from the dipping form and trimming, so that the finished product is a marketable article, all as described more specifically hereinafter.

In order that the invention may be more clearly understood, reference is now made to the accompanying drawings in which several embodiments of the invention are illustrated, it being understood that these embodiments are shown by way of illustration to indicate that the invention may be embodied in many different forms.

Figure 13:
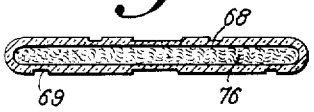
Figure 10:
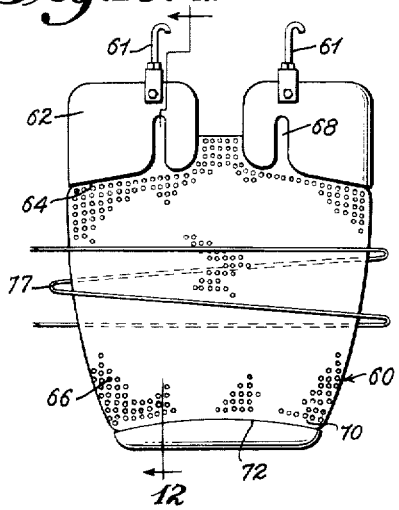
FIGURES 10 and 11 are front and back views respectively of a typical dipping form for making the girdle shown in FIGURES 7, 8 and 9.
Figure 12:
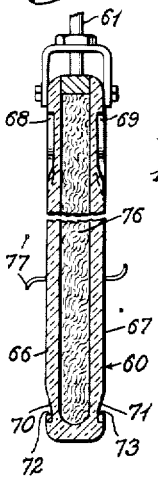
Figure 11:
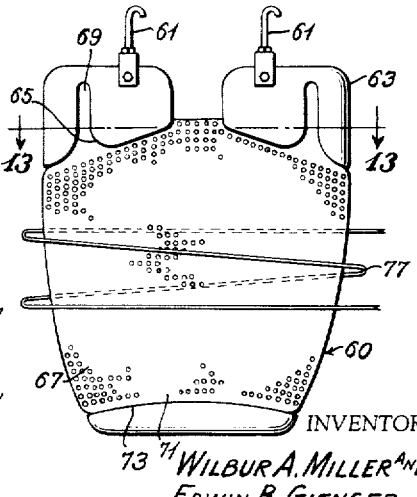
Figure 17:
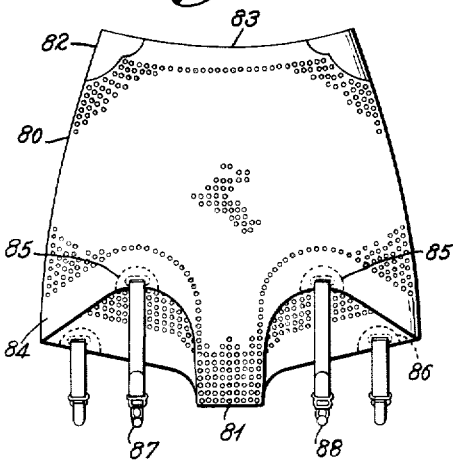
Figure 18:
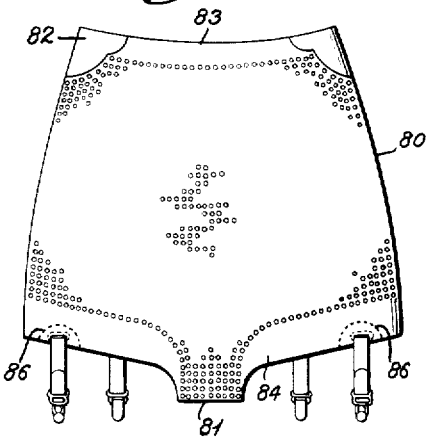
Figure 14:
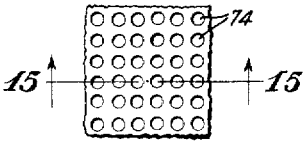
Figure 19:
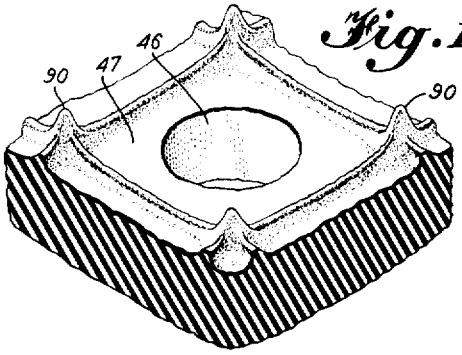
Figure 15:
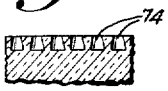
Figure 16:
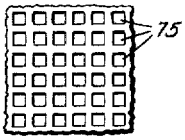
Figure 20:
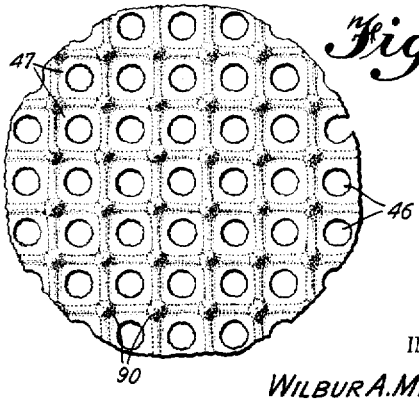

FIGURES 12 and 13 are cross-sectional views of the forms shown in FIGURES 10 and 11 taken along the lines 12—12 and 13—13 respectively;

FIGURE 14 is a greatly enlarged view of a small portion of the surface of the form shown in FIGURES 10 and 11 for forming the porous portion of the girdles heretofore shown;

FIGURE 15 is a cross-sectional view of the enlarged portion of the form shown in FIGURE 14 taken on the line 15—15;

FIGURE 16 is a greatly enlarged view of a small portion of a girdle form similar to the form shown in FIGURES 10 and 11 illustrating an alternate surface pattern having square cavities therein;

FIGURE 17 is a plan view of the front of a peripherally porous girdle having a porous crotch and reinforcements for attaching garters thereto;

FIGURE 18 is a plan view of the back of the girdle shown in FIGURE 17;

FIGURE 19 is a greatly enlarged view, on the body side, of a single pore in a particular embodiment of the girdle of the present invention; and FIGURE 20 is a drawing taken from a photomicrograph of a plurality of pores similar to the one shown in FIGURE 19.

Figure 1:
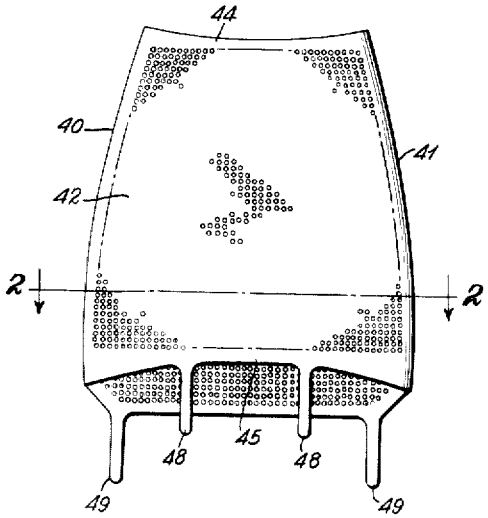
FIGURE 1 is a plan view of the front of a girdle illustrating a preferred embodiment of the invention, the girdle not being in use but in a relaxed position.
Figure 2:
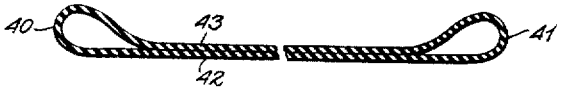
FIGURE 2 is a cross-sectional view of the girdle shown in FIGURE 1 along the line 2—2, on an enlarged scale.

Shown in FIGURE 1 is a supporting girdle or form fitting undergarment or sheath having oppositely disposed curved side areas 40 and 41, which are of limited width and extend over substantially the full longitudinal extent or depth of the girdle, and plane front and back areas 42 and 43, which plane areas are of considerably greater width or lateral extent than side areas 40 and 41 and are longitudinaly contiguous therewith. As shown in FIGURE 2, side areas 40 and 41 are of curved shape in cross section, and constitute symmetrical side portions which connect plane areas 42 and 43 together. Such areas 40 and 41 and the portions of plane areas 42 and 43 contiguous therewith cover the sides or hip regions of the wearer when in use. The girdle or sheath as a whole is contoured in that the top, which embraces the waist of the wearer, is narrower (i.e., has a smaller periphery) than the portion of the girdle below the waist which covers the buttocks of the wearer, the girdle increasing in width or peripheral extent until it reaches a maximum slightly above the bottom or leg opening where maximum freedom is desired. Because of its elasticity, the girdle is stretchable as a whole to enclose and mold the body of the wearer to the slim configuration desired.

Figure 3:
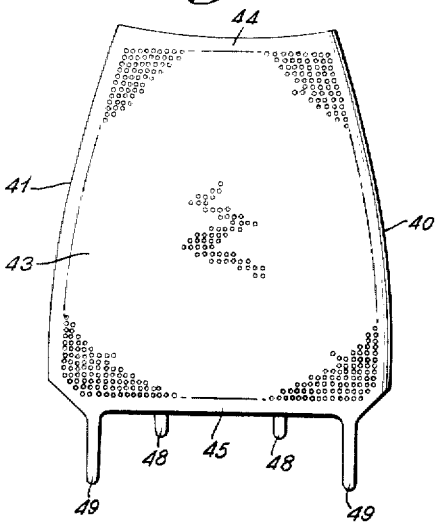
FIGURE 3 is a plan view of the rear of the girdle shown in FIGURE 1 in a relaxed position.

As shown in FIGURE 1 and in accordance with the present invention, substantially all of the plane area constituting the front of the girdle, except for narrow bands or margins 44 and 45 which are laterally disposed at the top and bottom of the girdle, contains a multitude of closely spaced pores, small holes, openings, orifices or foramina 46. FIGURE 3 illustrates a similar provision of pores in the plane area 43 constituting the back of the girdle. As shown more clearly in the enlarged view of FIGURE 4, pores 46 are closely spaced in a substantially regular and uniform pattern and are separated by thin webs or ribs 47. As is apparent from the cross-sectional enlarged view of FIGURE 5, pores 46 furnish substantially straight channels or passages between the inside surface of the girdle, which is next to the skin of the wearer, and the outside surface of the girdle, which is in communication with the atmophere except for impervious margins 44 and 45 and side areas 40 and 41. It has been found that pores 46 furnish very satisfactory ventilation and can be effectively manufactured when they are about 10 to 80, and preferably 20 to 35, thousandths of an inch wide when in an unstretched state. The thin webs or ribs 47 separating the pores 46 are generally not more than about 100 thousandths of an inch wide. In this manner, the sheath has imparted to it a fine open mesh-like construction.

The girdle may comprise front and back garter tabs or members 48 and 49, which consist of ribbon-like extensions of the latex material of the girdle and are integral with the lower imperforate margin 45, from which the garter tabs extend in a curve-like manner, as clearly shown in FIGURES 1 and 3. Garter tabs 48 and 49 may be reinforced at their edges, the reinforcements constituting a continuation of the marginal reinforcement of lower edge 45, generated as described below. Any suitable means (not shown) may be employed to attach the gripping portions of the garters to stretchable garter tabs 48 and 49.

Figure 4:
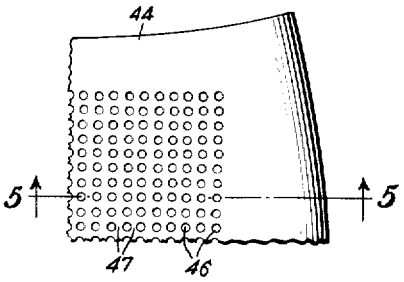
FIGURE 4 is a greatly enlarged view of a small area of the front of the girdle of FIGURE 1.
Figure 5:
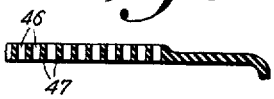
FIGURE 5 is a cross-sectional view of the area of FIGURE 4 taken along the line 5—5.
Figure 6:
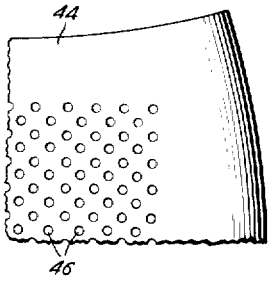
FIGURE 6 is a view similar to that shown in FIGURE 4 illustrating an alternative pattern or arrangement of the spacing of the pores therein.
Figure 7:
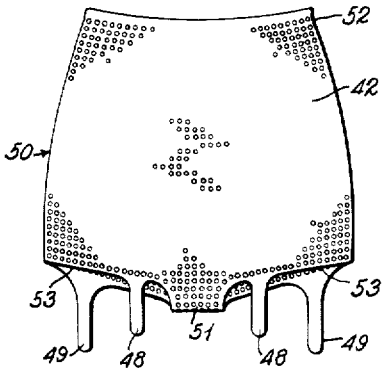
FIGURE 7 is a plan view of the front of a peripherally porous girdle having a porous crotch.
Figure 8:
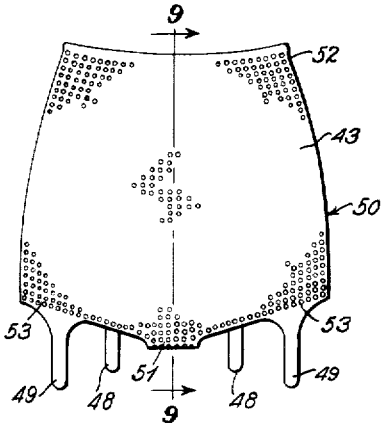
FIGURE 8 is a plan view of the back of the girdle shown in FIGURE 7.

In FIGURES 7 and 8 there is illustrated a crotch-type girdle 50, which is similar to the girdles molded with foramina therein shown in FIGURES 1 through 6, and which is in accordance with this invention. The foraminous area of girdle 50 is peripherally complete girthwise as well as extending in a band-like manner in the crotch element 51 which extends centrally from the front to the back of the girdle at the bottom thereof. Except as specifically modified herein, the general details of this girdle are essentially the same as those illustrated in FIGURES 1 and 3 heretofore described, and the same numbers have been applied to like portions thereof, except as otherwise designated. The crotch-type girdle has an imperforate top edge reinforcement 52 which extends horizontally around the girdle and an imperforate bottom edge reinforcement 53 which extends around the bottom edges of the girdle, the edges of the garter tabs and along the edges of the crotch. As shown in the drawing, the porous area may extend substantially to the upper or lower margin of the girdle but perferably is spaced at least one wall thickness, such as between about 20 to 50 thousandths of an inch, away from the actual edge. Accordingly, as shown in the drawing, the upper margin of the porous area may follow the shape of the upper margin of the girdle (i.e., concave). The lower margin similarly follows the bottom edge of the girdle except where the garter tabs extend downward. It is to be noted that FIGURES 4, 5, and 6 depict the structure of the foraminous areas of the girdle shown in FIGURES 7 and 8.

Figure 9:
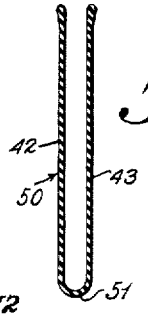
FIGURE 9 is an enlarged cross-sectional view of the girdle shown in FIGURE 8 taken along the line 9—9.

The girdles heretofore described having foraminous areas therein and illustrated by FIGURES 1, 3, 7 and 8 are prepared on dipping forms capable of producing during the molding of the garments the porous areas desired. Exemplary of a typical dipping form is a form 60 shown in FIGURES 10 through 13 for producing a crotch-type girdle as illustrated in FIGURES 7 through 9. This form is provided with hook-like supporting members 61 which project from the top of the form and are used to support the form during the dipping process hereinafter described and to hold the form when the girdle is stripped off the form at the conclusion of the dipping process. The form has surfaces 62 and 63 on the front and back of the form, respectively, which project upwardly from depressed portions 64 and 65 of main article generating surfaces 66 and 67 as shown in FIGURE 12. Main article generating surfaces 66 and 67 function to generate plane surfaces 42 and 43 of the girdle thereby producing a continuous seamless film. Surfaces 62 and 63, which generate a reinforced edge at the lower margin of the front and back of the girdle, shown in FIGURES 7 and 8, are provided with substantially perpendicular walls joining them with surfaces 64 and 65, respectively, the function and the action of which, in generating a marginal reinforcement during dipping, is clearly set forth in U.S. Patents 2,015,632 and 2,086,481, issued September 24, 1935, and July 6, 1937, respectively, to A. N. Spanel. Surfaces 62 and 63 have elongated ribbon-like channels 68 and 69 which constitute integral continuations of the main girdle generating surfaces 66 and 67, respectively, and which serve to form garter tabs 48 and 49 of the girdle, as shown in FIGURES 7 and 8, all as described more fully in U.S. Patent 2,360,736. The lowermost portions of main generating surfaces 66 and 67 terminate in depressed areas 70 and 71 which are bounded by latitudinally arcuate edges 72 and 73 which define the top of the front of the finished girdle and which cooperate with perpendicular inwardly extending walls joining these edges with the bottom of the form so as to form an edge for trimming as described in the above patents.

A multitude of blind pores, cavities, holes or follicles, 74, are shown in FIGURES 14 and 15. The cavities are positioned uniformly over most of the plane surfaces 66 and 67 of form 60, the distribution of cavities 74 being coextensive with the distribution of pores 46 in the girdle shown in FIGURES 7 and 8. These cavities 74 may be round, as shown in FIGURES 14 and 15, or of some other shape, e.g. square 75, as shown in FIGURE 16, or polygonal. These cavities effect an essential step in the formation of the girdle by trapping air therein during the dipping process, which air thereafter is expanded by heating, with the result that the expanded air breaks, bursts, ruptures, or presses open the wet film of rubber latex which has bridged across the mouth of the cavity during the dipping process, thus forming a pore, hole, orifice, opening or foramen in the film of latex deposited on the form. Because of the critical function of these cavities, their dimensions are carefully selected and correlated with the dipping conditions, including the rate or speed at which the dipping form is removed from the bath, the concentration of solids in the rubber latex, the viscosity and particularly the surface tension of the latex employed, so that a film of latex bridges over each cavity. The cavities should not be so wide that a substantial amount of latex runs into and fills up the holes. On the other hand, if the cavities are too small or shallow, the volume of air trapped is insufficient to exert enough pressure to break the bridging film during the subsequent expansion of the gas in the cavity by internal heating of the form. Diameters (or widths where square holes are formed) that are effective are in the range of about 10 to 100 thousandths of an inch, about 15 to 40 thousandths being particularly effective; an effective depth for the smaller cavities is of the order of 20 thousandths of an inch and depends upon the viscosity of the latex while generally the larger holes can be about as deep as they are wide.

Form 60 may be made of a hollow casing of glass or of any suitable metal which will not react with or discolor the material forming the film thereon. When the casing is made of glass or a suitable ceramic material, the hollow part may be packed with a material which will conduct heat, such as a ferromagnetic core. This can be advantageously accomplished by packing magnetic steel wool 76 in the hollow of the casing so that it uniformly and intimately contacts the interior surface of the form to transmit heat when an electromagnetic field is generated so that internal heat will permeate from the interior of the form. It is of course appreciated that other materials may be employed which will effect or will produce heating from within. Also, other methods may be employed to effect the blow-out of the foramina in the deposited latex film on the dipping form to produce the girdle of this invention.

Exemplary of a typical method of forming the porous girdle of this invention is the generating of a film on the form 60 by immersing it into a bath of rubber latex typically a natural latex compounded with vulcanizing agents, with the planes of generating surfaces 66 and 67 perpendicular to the surface of the bath, and then slowly removing from the bath, as one example, at a constant speed in the range of about 0.1 to 0.5 feet per minute. This particular operation forms a thin continuous film over the entire surface of the form, which is preferably immersed in the bath until the lowermost portions of hook-like members 61 are beneath the surface of the bath. Essentially, all the cavities 74 on the surface of the form contain pockets of entrapped air covered by bridging films which are integral portions of the continuous film covering the dipping form. For this operation, rubber latices containing from about 55 to 65 percent solids are satisfactory.

After the dipping operation has been completed, form 60, as it emerges from the bath, is subjected to the action of an electromagnetic field generated by an induction heating coil 77, which advantageously is a coil of water-cooled copper tubing connected to a source of alternating current of appropriate high frequency. (The details of frequency, power requirements, strength of magnetic field, etc. to achieve satisfactory induction heating are well known. See, for example, Industrial Electronics Reference Book by Electronics Engineers of the Westinghouse Electric Corp., John Wiley & Sons, Inc., New York, 1948, page 375 et seq.) Such a magnetic field heats steel wool 76 which transfers heat therein generated to the interior wall of the hollow casing and uniformly heats the walls of cavities 74, which walls in turn heat the gas entrapped in the cavities so that the gas expands and breaks, ruptures, or blows open the still plastic, flowable, or moldable bridging films over the cavities, thus forming the desired pores in the film of latex on the dipping form. The material in the broken films thereafter adjusts itself according to the forces of surface tension both around the hole or pore so formed and in the area surrounding the pore, thereby building up the web-like ribs between the pores at a faster rate than by the normal dipping process. *These holes or pores shaped by the surface tension of the wet latex may be referred to as wet-formed surface tension holes.*

It has been found that the force of surface tension so controls and molds the shape of the opening in the film of latex that a round hole is often formed even when square mouthed cavities are used, particularly if the film is built up to a thickness of 25 thousandths of an inch or more. Because the periphery of the pore formed by the above process is smooth and continuous, it resists tearing to a much greater extent than does a cut or perforated hole whose periphery necessarily contains minute nicks or cuts in it arising from the inevitable irregularity of any perforating device.

It will be noted that the above described method quickly, uniformly and progressively heats the form as it progressively emerges from the bath of latex, thus achieving continuous process control over the operation of blowing the bridging films over the cavities. The walls of all of the cavities in the film are subjected to uniform heating at substantially identical times with relation to their emergence from the bath of latex, thus achieving very exact control over the blowing operation which results in an extremely uniform product. Additionally, the amount of heat generated in the steel wool can be adjusted by varying the electromagnetic field so that the film of latex partially or completely dries. Additional drying or partial or complete curing of the finished latex film can be effected by additional induction heating, using a second coil which desirably can encompass the whole form.

After the deposited latex film has been dried or solidified to a point where subsequent dipping will not disturb the film, such as by induction heating as described above or by known methods including drying in an oven, the form is cooled, as in a water bath or in the atmosphere, and is subsequently dipped and blown alternately until the desired film thickness, such as a film thickness in the porous area of about 15 to 80 thousandths, and preferably about 25 to 50 thousandths of an inch, is built up on the form. The deposited latex film can then be removed from the form, cured and trimmed to yield a girdle or can be processed by any method for producing marketable dipped latex articles. In any event, the film should be treated while still on the form, as by drying and/or partial or complete curing, so that the film can be removed from the form in an unruptured condition. It will be noted that, because of its method of formation, the pores or holes in the finished girdle are much more tear-resistant than if such holes were formed by perforating or punching a cured continuous film or sheet of rubber, for the reasons noted above. Additionally, it has been observed that a porous film formed by the process of the present invention resists further tearing even after the web between the holes is torn, a characteristic which is in sharp contrast to an ordinary film of latex which tends to tear or rip without restraint once a tear is started.

An alternate form of girdle of this invention, similar to the girdles shown in FIGURES 1, 3, 7 and 8, is illustrated in FIGURES 17 and 18 in which a panty-type girdle 80 is shown having a crotch portion 81. The panty girdle has a foraminous area which is peripherally complete girth-wise as well as extending in a band-like manner in the crotch portion 81. At the top portion of the girdle at both sides thereof are impervious reinforced areas 82 which prevent the girdle from rolling, and between the non-rolling portions is an impervious top band 83, which reinforced areas and band define the top boundary of the foraminous areas of the girdle. Extending from the crotch on both sides of the front and back of the girdle are impervious edges 84 which define the lower boundary of the foraminous area. In the front section of edges 84 are positioned two reinforced pliable tear resistant areas 85, and two similar tear resistant areas 86 are in the back section thereof, positioned near the bottom edge of the girdle. These tear resistant areas are generally semi-circular in shape and during the molding of the girdle are placed in the front and rear sections at locations suitable for garter attachments. These reinforcements may be of metal encased in fabric or the like and in the shape of a bar or apertained elongated washers and are placed in these areas in the early stages of dipping so that further dipping completely encases the reinforcement in the wall of the girdle thereby making it an integral part thereof. Each of the reinforced areas is slotted so as to provide an elongated aperture adapted to receive a narrow elastic band, strip or ribbon 87 which can be made of an elastic fabric or rubber such as deposited latex. Band 87 is looped through the aperture and is fastened by conventional fastening means at its lower end to a suitable garter attachment 88. This construction of a reinforced aperture serves as a rigid reinforceing means to maintain the aperture undeformed when tension is applied to band 87, such as when stockings are attached to garter attachments 88. Thus is presented a girdle, having a foraminous area, molded to fit the human form with reinforcements for the various functions required by the wearer in a single unitary garment molded in a unit operation.

It has been discovered, in accordance with a particular aspect of the present invention, that the use of a polygonal cavity or pore which has angular corners, such as the square cavities shown in FIGURE 16, results in the highly desirable generation of a nap-like surface on the surface of the girdle which is contiguous to the dipping form during the dipping process. Such a nap-like or felt-like surface, which has the warm friendly feel of fabric rather than the less friendly feel of a smooth rubber film, results from a minor intrusion or running down of the liquid latex into the sharp corners of the pores to form fingers, streamers or tendrils 90 as shown in the greatly enlarged single hole shown in FIGURE 19. FIGURE 20, which is a drawing from a microphotograph of such a surface when enlarged ten times, shows the regularity with which such streamers are formed around each hole and the extremely close juxtaposition of such streamers to form a very uniform surface. Streamers 90 are apparently attached strongly enough to the body of the girdle as to be pulled out of the holes with considerable regularity, thus leaving the surface of the form substantially in the same condition as it was before the dip. Streamers 90 vary in length and are typically from about 10 to 30 and average 20 thousandths of an inch in length when generated on a form having square holes 25 thousandths of an inch wide.

As is apparent from the foregoing description, the present invention provides an effective solution to the long unsolved problem of providing adequate ventilation in a rubber latex girdle under conditions that lead to heavy perspiration. The girdle of the present invention is particularly effective in that it affords the greatest ventilation in the areas of greatest stretch where the material of the girdle is in closest proximity to the skin, and provides in a unitary molded garment impervious as well as pervious sections having mesh-like characteristics.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

[1. An elastic figure-controlling garment adapted when on the body to encircle and constrict the torso between the waist and upper thigh regions, said garment comprising a breathable seamless rubber sheath having a side outline approximate the female body contour between an upper relatively narrow waist opening and a lower relatively wider leg opening, said sheath being formed with laterally peripherally continuous surfaces and having a thickness built up by deposit of a plurality of layers of latex, each layer having formed therein a network of small closely spaced holes with smooth surfaces shaped by the surface tension of the deposited latex, the holes in said layers being in registry and extending through the thickness of said sheath and having projections thereabout on at least one surface of said sheath, said holes being disposed over a major portion of the sheath, and having a size and spacing such that the sheath has a fine open mesh-like breathing construction.]

[2. A garment according to claim 1 in which said holes are from about 0.010 to 0.080 inch in size and are generally not more than 0.100 inch apart.]

[3. A garment according to claim 2 in which the rubber sheath has a thickness of from about 0.015 to 0.080 inch.]

*4. As an article of manufacture an elastic figure-controlling foundation garment adapted when on the body to encircle and constrict the lower torso comprising a breathable seamless rubber sheath which when not being in use but being in a relaxed position is formed with both a curved shape in horizontal cross section and oppositely disposed curved side areas of side outline approximating the female body contour in the hip region, said sheath being formed with laterally peripherally continuous surfaces and having a thickness built up by deposit of a plurality of layers of latex, each layer having formed therein a network of small closely spaced wet-formed surface tension holes having smooth surfaces, the holes in said layers being in registry and extending through the thickness of said sheath and being disposed over a major portion of the sheath, and constituting a foraminous area*

*molded to fit the human form, said holes having a size and spacing such that the sheath has a fine open mesh-like breathing construction.*

*5. A garment according to claim 4 in which said holes are from about 0.010 to 0.080 inch in size and are generally not more than 0.100 inch apart.*

*6. A garment according to claim 5 in which the rubber sheath has a thickness of from about 0.015 to 0.080 inch.*

References Cited by the Examiner

The following references, cited by the Examiner, are of record in the patented file of this patent or the original patent.

UNITED STATES PATENTS

| | | | |
|---|---|---|---|
| 2,092,756 | 9/1937 | Grabec. | |
| 2,636,173 | 4/1953 | Barth | 128—521 |
| 2,708,271 | 5/1955 | Steinberg. | |
| 2,712,159 | 7/1955 | Ter Marsch | 264—316 |
| 2,749,549 | 6/1956 | Ambrose. | |
| 2,770,808 | 11/1956 | Bader et al. | 128—521 |
| 2,810,129 | 10/1957 | Sebrell. | |

FOREIGN PATENTS

| | | |
|---|---|---|
| 448,184 | 5/1936 | Great Britain. |

ADELE M. EAGER, *Primary Examiner.*